United States Patent
Choi et al.

(10) Patent No.: US 10,784,494 B2
(45) Date of Patent: Sep. 22, 2020

(54) SECONDARY BATTERY

(71) Applicant: LG Chem, Ltd., Seoul (KR)

(72) Inventors: Eun Sun Choi, Daejeon (KR); Jin Soo Lee, Daejeon (KR); Sung Pil Yoon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/061,759

(22) PCT Filed: Nov. 20, 2017

(86) PCT No.: PCT/KR2017/013212
§ 371 (c)(1),
(2) Date: Jun. 13, 2018

(87) PCT Pub. No.: WO2018/093224
PCT Pub. Date: May 24, 2018

(65) Prior Publication Data
US 2019/0267604 A1   Aug. 29, 2019

(30) Foreign Application Priority Data

Nov. 21, 2016   (KR) .......................... 10-2016-0155017

(51) Int. Cl.
*H01M 2/34*   (2006.01)
*H01M 2/12*   (2006.01)

(52) U.S. Cl.
CPC ............ *H01M 2/345* (2013.01); *H01M 2/34* (2013.01); *H01M 2200/20* (2013.01)

(58) Field of Classification Search
CPC ............ H01M 2/34; H01M 2/12; H01M 2/20; H01M 2/02
See application file for complete search history.

(56) References Cited

U.S. PATENT DOCUMENTS

| | | | |
|---|---|---|---|
| 5,332,632 | A | 7/1994 | Huhndorff |
| 5,705,290 | A | 1/1998 | Azema |
| 5,747,187 | A | 5/1998 | Byon |
| 2007/0054157 | A1 | 3/2007 | Ryu et al. |
| 2007/0172728 | A1* | 7/2007 | Yamashita .......... H01M 2/0413 429/174 |

(Continued)

FOREIGN PATENT DOCUMENTS

| | | |
|---|---|---|
| CN | 203277543 U | 11/2013 |
| JP | H09055197 A | 2/1997 |

(Continued)

OTHER PUBLICATIONS

Search report from International Application No. PCT/KR2017/013212, dated Mar. 16, 2018.

(Continued)

*Primary Examiner* — Kenneth J Douyette
(74) *Attorney, Agent, or Firm* — Lerner, David, Littenberg, Krumholz & Mentlik, LLP

(57) ABSTRACT

Disclosed is a secondary battery including a current blocking device. According to the present invention, the secondary battery in which when the secondary battery increases in volume due to overcharging, current flowing to the secondary battery is interrupted by using expansion force due to the increase in volume to improve safety and reliability may be manufactured.

5 Claims, 6 Drawing Sheets

(56) References Cited

U.S. PATENT DOCUMENTS

2010/0068606 A1    3/2010  Matthias

FOREIGN PATENT DOCUMENTS

| JP | H11329406 A | 11/1999 |
|---|---|---|
| JP | 2000285905 A | 10/2000 |
| JP | 2001229911 A | 8/2001 |
| JP | 2009009734 A | 1/2009 |
| JP | 2016110959 A | 6/2016 |
| KR | 100158845 B1 | 2/1999 |
| KR | 100764618 B1 | 10/2007 |
| KR | 101277250 B1 | 6/2013 |
| WO | 2015040471 A1 | 3/2015 |

OTHER PUBLICATIONS

Extended European Search Report including Written Opinion for Application No. EP17872133.8 dated Nov. 7, 2018.
Chinese Search Report for Application No. 201780005334.X dated Jun. 22, 2020, 1 page.

\* cited by examiner

SECONDARY BATTERY

CROSS-REFERENCE TO RELATED APPLICATION

The present application is a national phase entry under 35 U.S.C. § 371 of International Application No. PCT/KR2017/013212, filed on Nov. 20, 2017, published in Korean, which claims priority from Korean Patent Application No. 10-2016-0155017, filed on Nov. 21, 2016, the disclosures of which are hereby incorporated herein by reference.

TECHNICAL FIELD

The present invention relates to a secondary battery including a current interrupt device.

BACKGROUND ART

In general, a secondary battery capable of being repeatedly chargeable and dischargeable includes an electrode assembly having a structure in which an electrode and a separator are alternately laminated. Such a secondary battery may be divided into various types according to the kind of material used for manufacturing the secondary battery, for example, include a lithium secondary battery.

The secondary battery may be fired or exploded during the use. In order to prevent the fire or explosion, various safety devices may be provided in the secondary battery.

For example, the secondary battery may be provided with a safety device for preventing the fire or explosion from occurring when the secondary battery is overcharged.

According to the related art, as the safety device for preventing the fire or explosion caused by the overcharging of the secondary battery, a thermal cutoff operation (TCO) device is often provided in the secondary battery. The TCO device serves to interrupt current when heat is generated in the secondary battery due to the overcharging of the secondary battery, thereby preventing the current from flowing to the secondary battery to prevent the secondary battery from being fired or exploded.

However, since the TCO device operates when heat is generated in the secondary battery, i.e., when the secondary battery increases in temperature, the TCO device may operate even when a temperature around the secondary battery increases, not when the heat is generated in the secondary battery.

In addition, even if the secondary battery is overcharged by a small amount of current, the current should be interrupted. However, in this case, since a large amount of heat is not generated in the secondary battery, the TCO device may not properly operate, and thus, the secondary battery may be continuously overcharged. On the contrary, when a relatively large amount of current flows to the secondary battery even though the secondary battery is not overcharged, and thus, there is no risk of the fire or explosion in the secondary battery, the TCO device may interrupt the current.

DISCLOSURE OF THE INVENTION

Technical Problem

Thus, an object of the present invention is to provide a secondary battery which interrupts current when the secondary battery is in an overcharged state and allows the current to continuously flow when it is unnecessary to interrupt the current because the secondary battery is not in the overcharged state to improve safety of the secondary battery and effectively control a flow of the current.

Technical Solution

In order to achieve the above described objective, according to one aspect of the present invention, a secondary battery includes: a cell body; and a current interrupt device mounted on the cell body, wherein the current interrupt device operates by force applied to the current interrupt device according to an increase in volume of the cell body to interrupt current flowing to the cell body.

The current interrupt device may include: a protrusion part disposed on an upper portion of the cell body; and a wrapping part wrapping at least a portion of the cell body and the protrusion part, wherein, as the secondary battery increases in volume, the wrapping part may be spaced apart from the protrusion part by force applied to the wrapping part.

The current interrupt device may further include: a wrapping part wrapping at least a portion of the cell body; and an electrically conductive part providing a path of the current flowing through the cell body in a state of being connected to the wrapping part, wherein the wrapping part may be spaced apart from the electrically conductive part by force applied to the wrapping part as the secondary battery increases in volume to interrupt the current flowing through the electrically conductive part.

The electrically conductive part may include a first electrically conductive part and a second electrically conductive part, a portion of the wrapping part may be disposed between the first electrically conductive part and the second electrically conductive part, the wrapping part and the first electrically conductive part and the wrapping part and the second electrically conductive part may be connected to each other, and as the secondary battery increases in volume, the wrapping part may be spaced apart from at least one of the first electrically conductive part and the second electrically conductive part by the force applied to the wrapping part.

The secondary battery may further include an insulation part disposed between the cell body and the protrusion part.

The secondary battery may further include a negative electrode terminal disposed on an upper portion of the cell body, wherein the second electrically conductive part may be connected to the negative electrode terminal.

Advantageous Effects

According to the present invention, the secondary battery may interrupt the current when the secondary battery is in the overcharged state and allow the current to continuously flow when it is unnecessary to interrupt the current because the secondary battery is not in the overcharged state to improve the safety of the secondary battery and effectively control the flow of the current.

MODE FOR CARRYING OUT THE INVENTION

Hereinafter, a structure of a secondary battery according to the present invention will be described with reference to the accompanying drawings.

Structure of Secondary Battery

Figure 1:
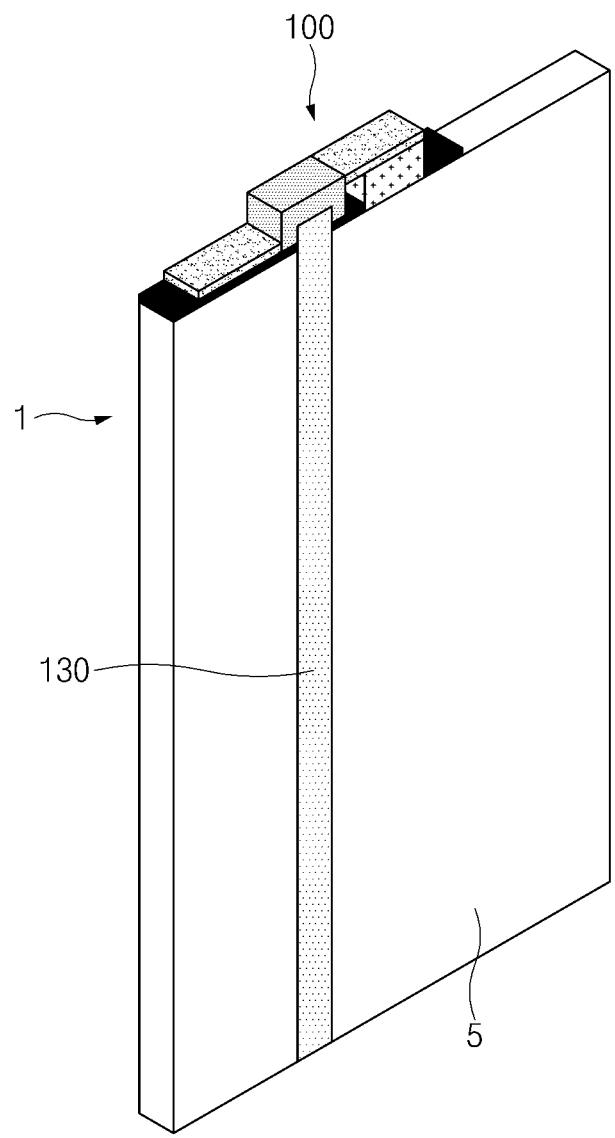
FIG. 1 is a perspective view of a secondary battery according to an embodiment of the present invention.
Figure 2:
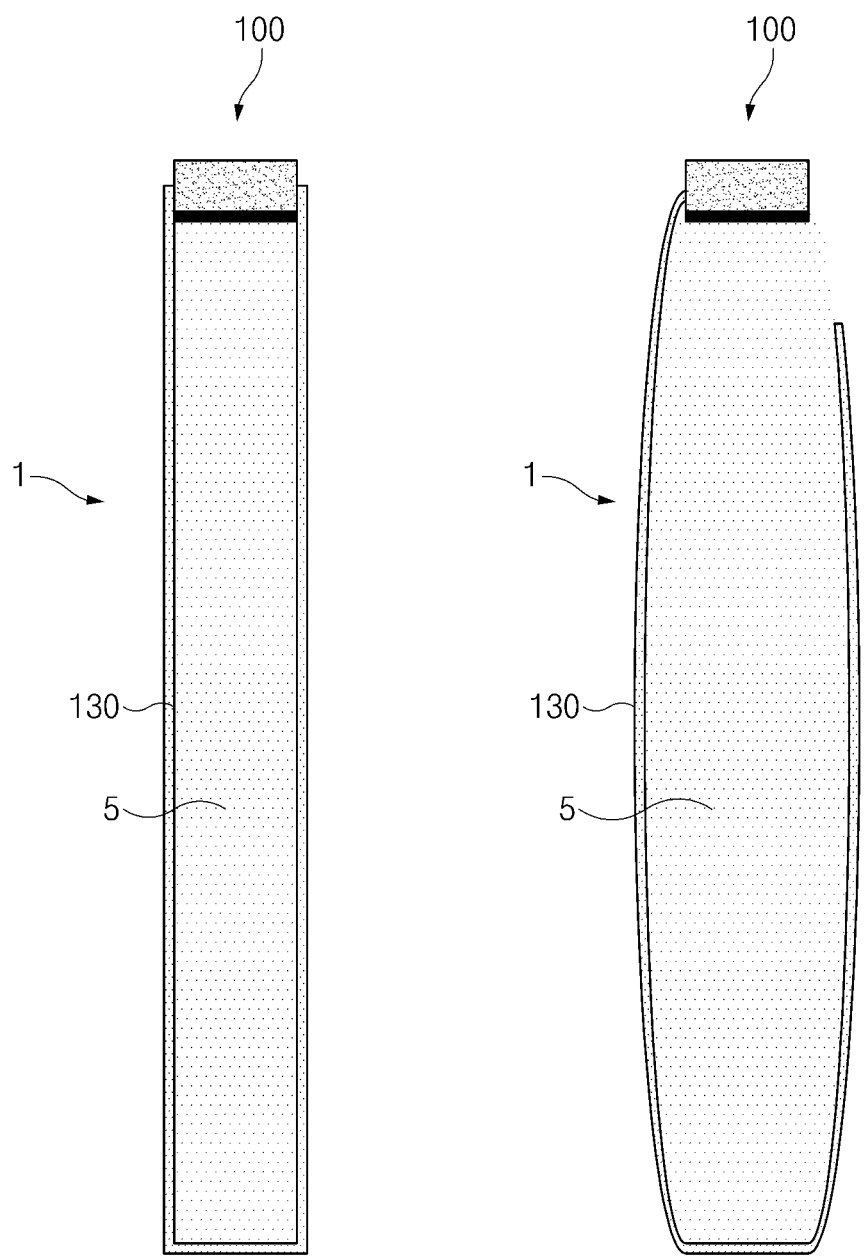
FIG. 2 is a side view illustrating an operation principle of the secondary battery according to an embodiment of the present invention.

FIG. 1 is a perspective view of a secondary battery according to an embodiment of the present invention, and FIG. 2 is a side view illustrating an operation principle of the secondary battery according to an embodiment of the present invention.

Referring to FIG. 1, a secondary battery 1 according to an embodiment of the present invention may be a prismatic type battery. However, the present invention is not limited thereto. For example, various types of batteries may be applied to the secondary battery 1 according to an embodiment of the present invention.

The secondary battery 1 according to an embodiment of the present invention may include a cell body 5 constituting a body of the secondary battery. The secondary battery 1 according to an embodiment of the present invention may include a current interrupt device 100. The current interrupt device 100 may be a constituent mounted on the cell body 5.

The current interrupt device 100 may be configured to prevent current from flowing to the secondary battery 1 when the secondary battery is overcharged while allowing the current to flow through the secondary battery 1 at all times. As described below, the current interrupt device 100 may include a wrapping part 130 surrounding the cell body 5. Although the wrapping part 130 wraps a circumference of the cell body 5 on the whole in FIG. 1, the wrapping part 130 may wrap only a portion of the circumference of the cell body 5.

When the secondary battery is overcharged, various abnormal phenomena may occur in the secondary battery. For example, when the secondary battery is overcharged, the secondary battery may increase in temperature due to heat generation of the secondary battery. However, the temperature of the secondary battery may increase not only by the heat generation of the secondary battery but also when a temperature around the secondary battery increases. Thus, it may be undesirable to interrupt current flowing to the secondary battery according to the temperature of the secondary battery.

When the secondary battery is overcharged, the secondary battery may increase in volume. That is, the secondary battery 1 may be generally maintained in a constant state as illustrated in the left side of FIG. 2, and when the secondary battery 1 is overcharged, the secondary battery 1 may increase in volume due to an increase in thickness of the secondary battery 1 as illustrated in the right side of FIG. 2.

Since the change in volume of the secondary battery is not affected by the temperature around the secondary battery, unlike the change in temperature of the secondary battery, the change in volume of the secondary battery as compared with the change in temperature of the secondary battery may be utilized as a more reliable variable that is capable of determining whether the secondary battery is overcharged.

The present invention may be an invention relating to interrupting of current flowing to the secondary battery when a volume of the secondary battery reaches a certain level by using a change in volume of secondary battery, which occurs when the secondary battery is overcharged.

That is, according to an embodiment of the present invention, as illustrated in FIG. 2, the wrapping part 130 may be disposed on the circumference of the cell body 5 of the secondary battery 1. When the secondary battery 1 increases in volume due to the overcharging of the secondary battery 1, expansion force may be applied to the wrapping part 130. According to an embodiment of the present invention, when force applied to the wrapping part 130 reaches a certain level by the expansion force due to the increase in volume of the secondary battery 1, at least a portion of the wrapping part 130 may be spaced apart from the cell body 5 to interrupt the current flowing to the secondary battery 1. FIG. 2 illustrates a case in which a portion of an upper region of the wrapping part 130 is spaced apart from the cell body 5 by the expansion force due to the increase in volume of the secondary battery 1 to interrupt the current flowing to the secondary battery 1.

Figure 3:
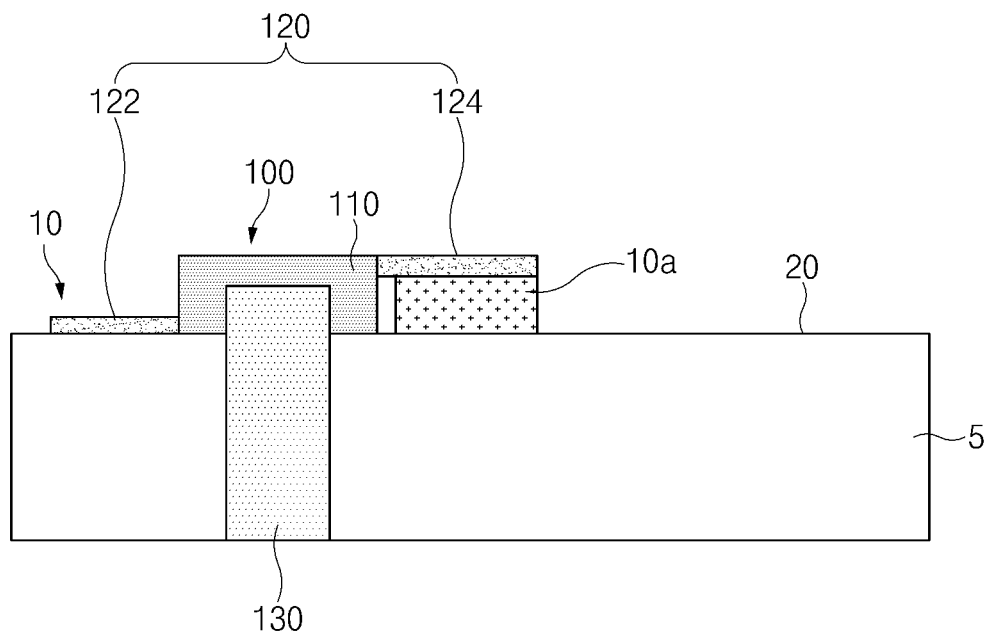
FIG. 3 is an enlarged side view illustrating an upper end of the secondary battery according to an embodiment of the present invention.

FIG. 3 is an enlarged side view illustrating an upper end of the secondary battery according to an embodiment of the present invention.

As illustrated in FIG. 3, the current interrupt device 100 of the secondary battery according to an embodiment of the present invention may include a protrusion part 110 disposed on an upper portion of the cell body 5, a wrapping 130 wrapping at least a portion of the cell body and the protrusion part, and an electrically conductive part 120 providing a path of the current flowing through the cell body 5 in a state of being connected to the wrapping part 130.

The electrically conductive part 120 may include a first electrically conductive part 122 and a second electrically conductive part 124. Here, a portion of the wrapping part 130 may be disposed between the first electrically conductive part 122 and the second electrically conductive part 124. Also, the wrapping part 130 and the first electrically conductive part 122 may be connected to each other, and the wrapping part 130 and the second electrically conductive part 124 may be connected to each other. The wrapping part 130 and the first electrically conductive part 122 and the wrapping part 130 and the second electrically conductive part 124 may be connected to each other through welding.

Here, in this specification, the meaning of 'connected' between the constituents may be interpreted to mean that the constituents are electrically connected so that current flows between the constituents. Accordingly, in this specification, when the term 'connected to each other' is described, it may be interpreted to include not only direct contact between the constituents but also indirect connection to allow current to flow therethrough.

Referring to FIG. 3, an electrode terminal, particularly, a negative electrode terminal 10a may be disposed on the upper portion of the cell body 3. The negative electrode terminal 10a may be connected to the electrically conductive part 120. FIG. 3 illustrates a case in which the negative electrode terminal 10a is connected to the second electrically conductive part 124. As a result, according to an embodiment of the present invention, the electrically conductive part 120, the wrapping part 130, and the negative electrode terminal 10a may be electrically connected to each other to allow the current to flow while the secondary battery is charged. Here, when the negative electrode terminal 10a is disposed on the upper portion of the cell body 5, the electrically conductive part 120 and the wrapping part, which are electrically connected to the negative electrode terminal 10*a* may constitute a negative electrode 10, and a surface of the cell body 5 may constitute a positive electrode 20.

Figure 4:
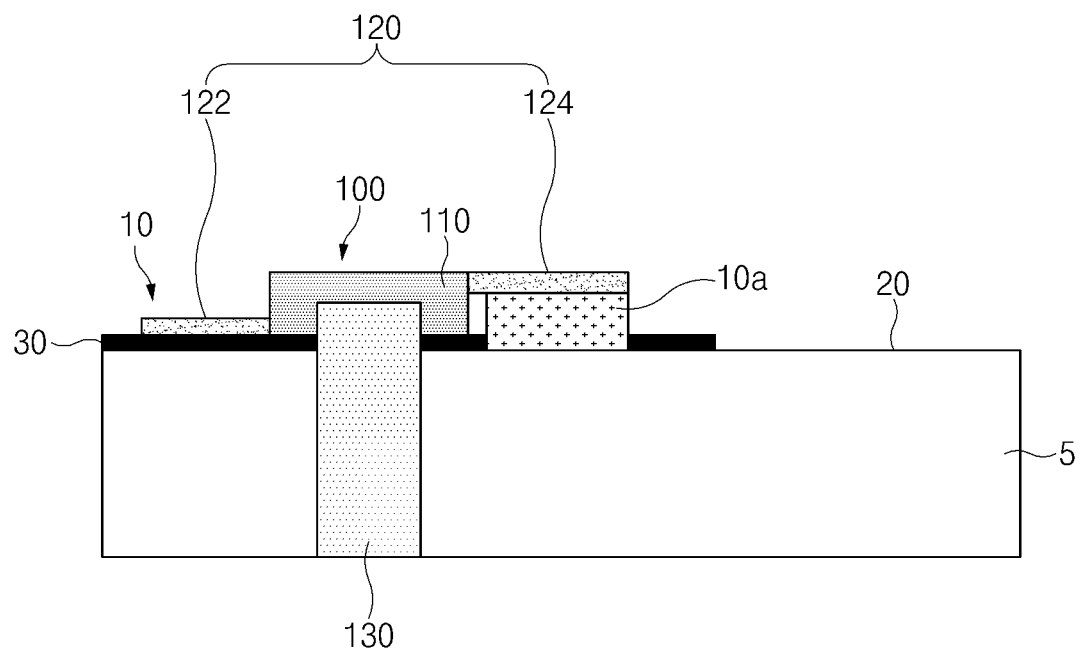
FIG. 4 is an enlarged side cross-sectional view illustrating an upper end of a secondary battery according to another embodiment of the present invention.

FIG. 4 is an enlarged side cross-sectional view illustrating an upper end of a secondary battery according to another embodiment of the present invention.

As illustrated in FIG. 4, a secondary battery according to another embodiment of the present invention may include an insulation part 30 disposed between a cell body 5 and a protrusion part 110. According to another embodiment of the present invention, the insulation part 30 may be provided in the secondary battery to prevent current from directly flowing from a wrapping part or an electrically conductive part to the cell body 5, thereby improving safety.

Hereinafter, a principle of interrupting current flowing to the secondary battery according to the present invention will be described with reference to the accompanying drawings.

Figure 5:
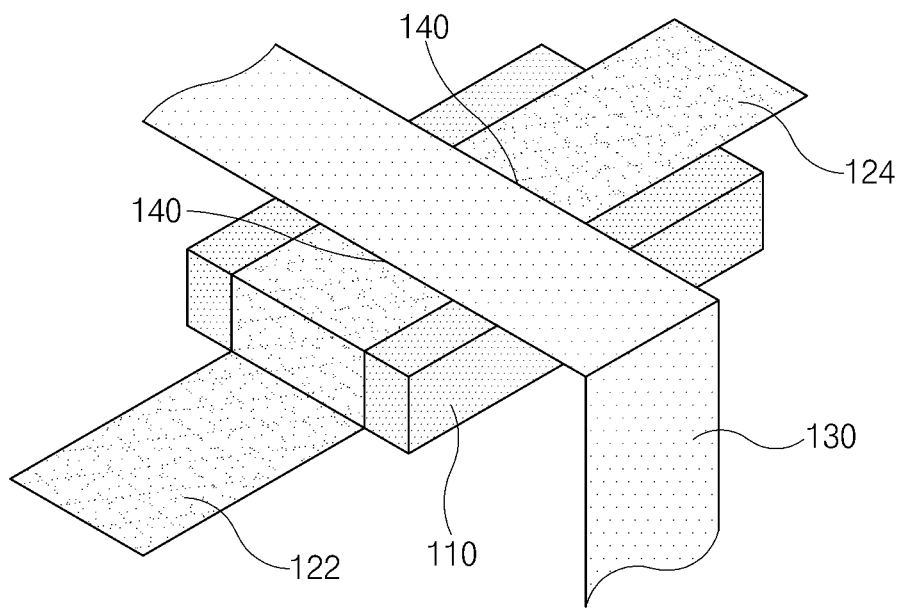
FIGS. 5 and 6 are perspective view for explaining an operation principle of a current interrupt device according to an embodiment of the present invention.

As illustrated in FIG. 5, the wrapping part 130 and the electrically conductive parts 122 and 124 may be usually connected to each other so that current flows through the secondary battery. FIG. 5 illustrates a connection part 140 that is a point at which the wrapping part 130 is connected to a first electrically conductive part 122 and a second electrically conductive part 124. The connection part 140 may be formed through the welding as described above.

Figure 6:
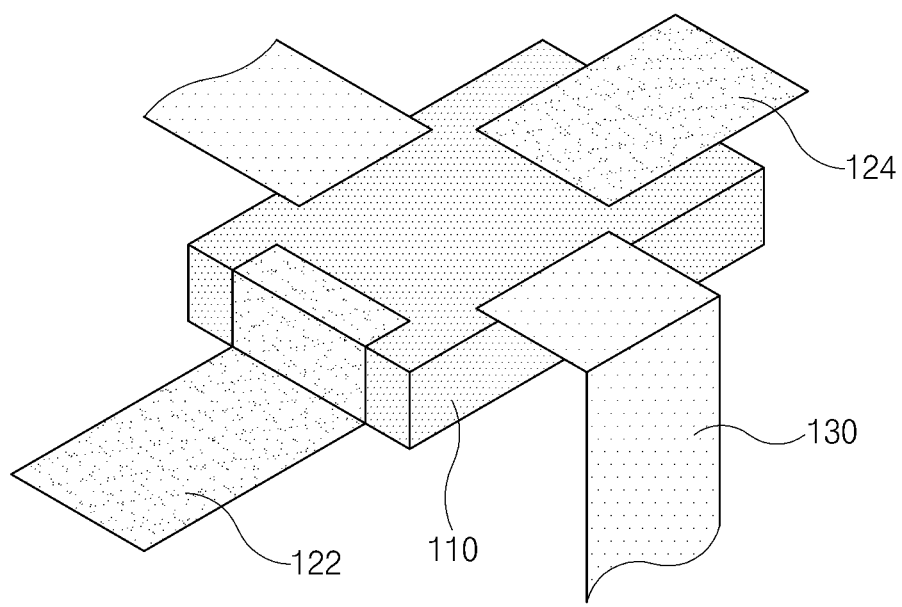

However, in the case in which the secondary battery or the cell body increases in volume due to the overcharging of the secondary battery or the like, when the wrapping part 130 wrapping a circumference of the cell body may receive force from the cell body. Here, when the force reaches a certain level, the wrapping part 130 may be spaced apart from the electrically conductive part. FIG. 6 illustrates a case in which the wrapping part 130 is spaced apart from the first electrically conductive part 122 and the second electrically conductive part 124. Here, since the wrapping part 130 is a constituent that wraps the protrusion part 110, when the force applied from the cell body to the wrapping part 130 reaches a certain level, it is also contemplated that the wrapping part 130 is spaced apart from the protrusion part 110.

As the wrapping part is spaced apart from the electrically conductive part, since the first electrically conductive part 122 and the second electrically conductive part 124 are not electrically connected to each other, the current from the outside is prevented from flowing to the secondary battery. Therefore, when the secondary battery increases in volume due to the overcharging or the like, the current flowing to the secondary battery may be interrupted.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
a cell body having an electrode terminal; and
a current interrupt device mounted on the cell body, the current interrupt device comprising:
an electrically conductive part providing a path for current flowing through the cell body, the electrically conductive part including a first electrically conductive part and a second electrically conductive part, the second electrically conductive part being electrically connected to the electrode terminal, and the first and second electrically conductive parts being separated from one another at a connection region; and
a wrapping part surrounding at least a portion of a circumference of the cell body, the wrapping part having a first portion and a second portion, the first portion positioned in the connection region and electrically connected to both the first electrically conductive part and the second electrically conductive part so as to define an electrical connection between the first and second electrically conductive parts, wherein the second portion is connected to the cell body such that, when the cell body increases in volume, a force is applied to the wrapping part so as to cause the first portion to move away from the connection region to thereby sever the electrical connection between the first and second electrically conductive parts, whereby current flow to the cell body via the electrically conductive part is interrupted.

2. The secondary battery of claim 1, wherein the current interrupt device comprises:
a protrusion part disposed on an upper portion of the cell body;
wherein the wrapping part surrounds at least a portion of the protrusion part, and
wherein, as the cell body increases in volume, the force applied to the wrapping part causes the first portion to move so as to be spaced apart from the protrusion part.

3. The secondary battery of claim 1,
wherein, as the cell body increases in volume, the force applied to the wrapping part causes the first portion to move so as to be spaced apart from at least one of the first electrically conductive part and the second electrically conductive part.

4. The secondary battery of claim 2, further comprising an insulation part disposed between the cell body and the protrusion part.

5. The secondary battery of claim 3, wherein the electrode terminal is a negative electrode terminal disposed on an upper portion of the cell body.

* * * * *